United States Patent [19]

Winwood et al.

[11] Patent Number: 4,978,268

[45] Date of Patent: Dec. 18, 1990

[54] COLLECTION VEHICLE, HOIST FOR THE VEHICLE AND METHOD OF TIPPING A BIN

[75] Inventors: Hugh Winwood, Kidderminster; Peter Green, Catshill, both of United Kingdom

[73] Assignee: Waste Hoists Limited, United Kingdom

[21] Appl. No.: 361,187

[22] Filed: Jun. 5, 1989

[51] Int. Cl.$^5$ .................. B65G 67/04

[52] U.S. Cl. .................. 414/409; 414/420; 414/648

[58] Field of Search .................. 414/404, 406, 408, 409, 414/419, 420, 639, 645–650

[56] References Cited

U.S. PATENT DOCUMENTS

| | | | |
|---|---|---|---|
| 1,425,346 | 8/1922 | Stoen | 414/648 X |
| 1,763,499 | 6/1930 | Bolger . | |
| 2,908,410 | 10/1959 | Glanz | 414/409 |
| 3,005,561 | 10/1961 | Zoller . | |
| 3,040,919 | 6/1962 | Nolan | 414/420 X |
| 3,087,637 | 4/1963 | Fox | 414/409 X |
| 3,136,436 | 6/1964 | Erlinder et al. | 414/648 X |
| 3,944,092 | 3/1976 | Ebeling et al. | 414/409 |
| 4,305,693 | 12/1981 | Naab | 414/420 X |
| 4,597,710 | 7/1986 | Kovats | 414/409 |
| 4,699,557 | 10/1987 | Barnes . | |
| 4,722,658 | 2/1988 | Würtz et al. | 414/408 |
| 4,824,315 | 4/1989 | Naab et al. | 414/408 |

FOREIGN PATENT DOCUMENTS

| | | | |
|---|---|---|---|
| 3640132 | 10/1987 | Fed. Rep. of Germany | 414/409 |
| 960194 | 4/1950 | France . | |
| 8200035 | 3/1982 | PCT Int'l Appl. . | |
| WO83/03242 | 9/1983 | PCT Int'l Appl. . | |
| 682876 | 11/1952 | United Kingdom . | |
| 2080757A | 2/1982 | United Kingdom . | |
| 2168316 | 6/1986 | United Kingdom | 414/409 |
| 2191461 | 12/1987 | United Kingdom | 414/408 |

*Primary Examiner*—Robert J. Spar
*Assistant Examiner*—John Vanden Bosche
*Attorney, Agent, or Firm*—Skjerven, Morrill, MacPherson, Franklin & Friel

[57] ABSTRACT

A refuse collection vehicle has a pair of hoists at the rear of a body of the vehicle. Each hoist includes a carriage which slides up and down on guide bars. A bin-carrier is pivotally mounted on the carriage. Engagement of an element on the carrier with a fixed abutment during upward movement of the carriage causes the carrier to tip.

7 Claims, 4 Drawing Sheets

COLLECTION VEHICLE, HOIST FOR THE VEHICLE AND METHOD OF TIPPING A BIN

BACKGROUND TO THE INVENTION

The present invention relates to a hoist for use on a vehicle to lift from the ground a container containing refuse and to discharge the contents of the container into a body of the vehicle.

In U.S. Pat. No. 4,699,557, issued Oct. 13th 1987 to Kevin P. Barnes, there is disclosed a vehicle having a hoist with a mast and a carriage for a container. The carriage can be raised up the mast by operation of a first motor and the mast can be tilted by a second motor to discharge the contents of the container into a body of the vehicle. In GB No. 2,080,757A, published 10th February 1982, there is also disclosed a collection vehicle having a carrier for a container and a structure on which the carrier is mounted, the structure being interposed between the carrier and the vehicle body and the carrier being movable on the structure by a first motor. A second motor is provided for tipping the carrier and container relative to the structure. The hoists described in the Barnes patent and in GB No. 2,080,757A are relatively complicated and expensive hoists.

A simpler hoist is disclosed in W083/03242 published Sept. 29th 1983. This International application discloses a hoist which includes a carriage and a frame for mounting on a body of the vehicle. The carriage is arranged for reciprocation vertically on the frame and a carrier for a container is pivotally mounted on the carriage. A single ram is incorporated in the hoist. This ram acts between the frame and the carrier so that, when the ram is extended, the carriage is driven up the frame until its travel is arrested and the carrier is then tipped relative to the carriage by a further extension of the ram.

SUMMARY OF THE INVENTION

According to a first aspect of the present invention, there is provided a hoist suitable for mounting on a vehicle to raise a bin from the ground and tip contents of the bin into a body of the vehicle, wherein the hoist includes a carriage, a guide for guiding the carriage for reciprocation along a rectilinear path relative to the body of the vehicle, a motor for moving the carriage along said path and a carrier for the bin, the carrier being mounted for tipping relative to the carriage to tip the contents of the bin into a body of the vehicle, wherein the hoist also includes a cam and a follower mounted one on the carrier and the other in fixed relation to the guide for mutal cooperation to tip the carrier relative to the guide when the carriage is reciprocated.

When the hoist is fitted to a vehicle, the guide means will be arranged for guiding the carriage along a path which extends upwardly and downwardly and which will usually be at least approximately vertical, when the vehicle is standing on horizontal ground. The carrier is preferably mounted for tipping relative to the carriage about a tipping axis which is perpendicular to the path of travel of the carriage and which is horizontal, when a vehicle to which the hoist is fitted is standing on horizontal ground.

The motor is conveniently an hydraulically operated motor, for example a piston and cylinder unit. It will be understood that collection vehicles generally include additional hydraulic motors for operating devices additional to the hoist. A single motor is preferably arranged for moving the carriage along said path and also pivoting the carrier relative to the carriage.

The rectilinear path preferably corresponds to the entire range of permitted travel of the carriage. This facilitates the provision of a reliable and relatively inexpensive guide. The carriage may slide on the guide.

Known hoists comprise a number of pivoted links connecting a bin-carrier with a support which can be pivoted relative to a body of a vehicle for tipping the contents of a bin on the carrier into a body of the vehicle. The pivots of the links are necessarily exposed to the weather, to dust which results from tipping of refuse into the vehicle body and to other contamination. It is common for the pivot bearings to become contaminated by matter which causes rapid wear of the bearings. Such wear leads to play in the linkages. Operation of a hoist which has worn bearings to tip the contents of a bin into a vehicle body generate excessive noise and the motion of the bin is not completely controlled. The known hoists require a considerable effort to be devoted to maintenance, particularly to lubrication of the bearings and renewal of worn bearings.

The present invention avoids the necessity for a number of pivoted links, thereby avoiding the disadvantages associated with such links.

There is also provided in accordance with the invention a collection vehicle having a body for receiving a load of material to be collected and a hoist in accordance with the first aspect of the invention.

The vehicle preferably comprises a pair of carriers with respective carriages, guides and motors, the carriers being arranged side-by-side at the rear of the vehicle so that two bins can be raised and tipped by respective carriers concurrently. The motors associated with the carriers are preferably arranged so that they can be operated independently. However, it is also advantageous to provide means for operating the two motors in unison in a case where a single, large bin is to be lifted and tipped by the two carriers. Thus, the hydraulic system may be settable in a first condition, in which the motors can be operated independently of each other, and in a second condition in which the motors operate in unison.

The guide for each of the two carriages preferably lies to one side only of the carrier mounted on that carriage. This would be the side remote from the other carrier, so that the loading opening defined by the vehicle body would not be obstructed by the guides. The guides would lie adjacent to lateral margins of the loading opening.

In the preferred hoist, the carrier is provided with an element spaced from the tipping axis and the guide includes guide means for guiding said element, the arrangement being such that the carriage and said element are moved by the motor along respective paths which include mutually parallel portions and mutually divergent portions. Whilst the carriage and said element move along the mutually parallel portions of their respective paths, the attitude of the carrier will be maintained constant relative to the carriage. When the carriage and the element move along mutually divergent portions of their respective paths, the carrier will be tipped relative to the carriage.

The guide means may include means engageable with said element for for diverting the element from a path which is parallel to the path of travel of the carriage, the element being engageable with the diverting means as the carriage approaches an end portion of the path of the carriage.

Alternatively, the guide means may include an abutment which is engageable with said element to restrain or restrict travel of said element with the carriage as the carriage approaches an end portion of its path.

In a further alternative arrangement, the guide means defines that portion of the path of said element which is parallel to the path of travel of the carriage but allows said element to divert from a path which is parallel to that of the carriage, as the carriage approaches the end portion of its path. The motor may so connected with the carrier as to exert thereon a torque about the tipping axis, the torque being resisted by the action of the guide means on said element whilst the element is confined to a path of travel parallel to the path along which the carriage is moved and the carrier being permitted to tip relative to the carriage under the action of the torque exerted by the motor, when the element is permitted to divert from a path parallel to the path of travel of the carriage. The motor may be a reciprocating ram connected with the carrier to act thereon at a position spaced from the tipping axis and thereby to exert torque on the carrier.

The carrier preferably comprises a hollow structure containing bearings which are supported by the carriage inside the structure, the bearings defining the tipping axis of the carrier. There may further be provided an inner shaft which extends through the interior of the carriage and through the interior of the bearings, the inner shaft providing a torque-transmitting connection between said element and the carrier. Said element may be provided adjacent to one end of the inner shaft whilst the carrier is connected with the inner shaft adjacent to the opposite end thereof.

The carriage preferably embraces the guide or a member thereof. In the preferred construction, the guide comprises two mutually parallel bars disposed in side-by-side, mutually spaced relation. One of these bars may be embraced by the carriage. The other bar may be received in a gap between spaced portions of the carriage. Said other bar may have respective faces which are engaged by said portions of the carriage, are flat and are mutually parallel. A plane lying mid-way between those faces may be spaced from an axis of the one bar.

There is also provided in accordance with the invention a method of tipping a bin wherein a carrier is engaged with the bin in a manner to support same, the carrier is raised into engagement with an abutment and wherein raising of the carrier and bin relative to the abutment is constrained so that the carrier and bin are forced to tip relative to the abutment.

In the preferred method, tipping of the bin and carrier relative to the abutment causes a retainer to approach the bin and hold same on the carrier during tipping.

DESCRIPTION OF PREFERRED EMBODIMENT

An example of a vehicle embodying the invention will now be described, with reference to the accompanying drawings, wherein.

Figure 1:
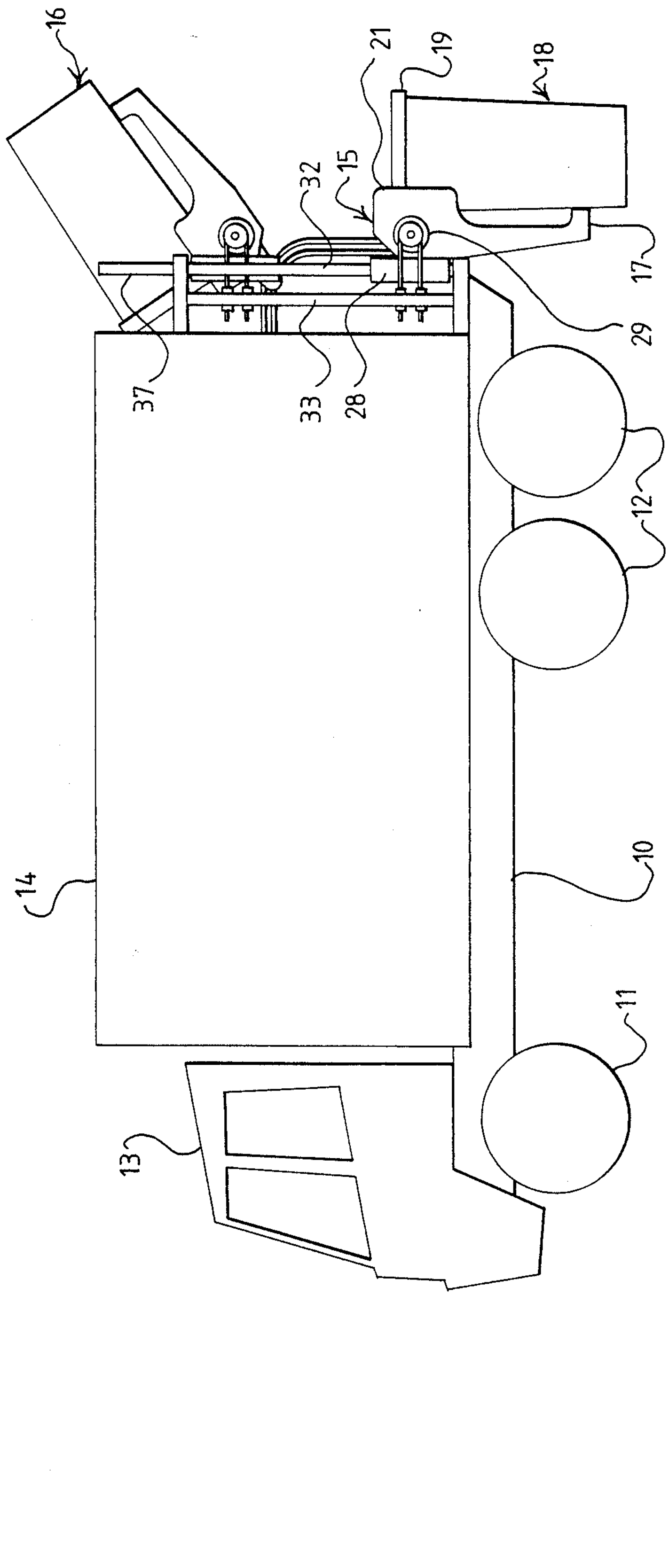
FIG. 1 shows a diagrammatic representation of a side elevation of a vehicle, together with a first bin standing on the ground behind the vehicle and a second bin which has been raised and tipped by the vehicle.
Figure 2:
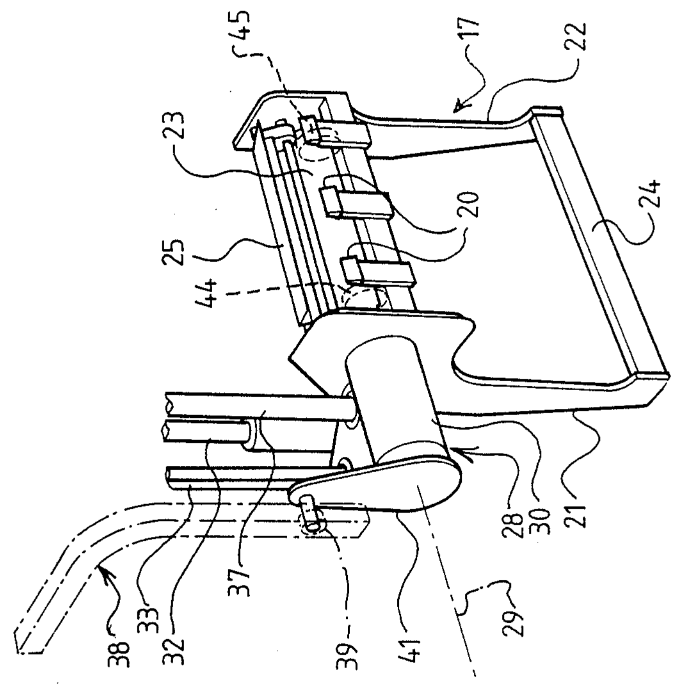
FIG. 2 shows a perspective view of one carrier of the vehicle, as viewed from a position to the rear and to one side of the vehicle, together with certain parts of an associated carriage and associated guide.

The vehicle illustrated in FIG. 1 comprises a chassis 10 mounted on steerable front wheels 11 and driven rear wheels 12. On the chassis, there is mounted a cab 13 for operators of the vehicle and a hollow body 14 for containing a load. At the rear end of the vehicle, the body defines a rearward-facing loading opening which extends downwardly from the top of the body to a level somewhat above the bottom of the body and which extends across almost the entire width of the body. The body may include a pivoted tailgate (not shown) which defines the loading opening, extends forwardly from that opening and includes a hopper and a packing mechanism for moving refuse into a forward part of the body. The tailgate and packing mechanism may be of known construction and will not be described further. There is mounted on the body 14 at the rear of the vehicle two hoists 15, 16 for lifting bins from the ground and tipping contents of those bins into the body 14. The hoists are disposed side-by-side on the vehicle body and can be operated independently of each other. Accordingly, the construction and operation of one only of the hoists will be described in detail.

The hoist 15 comprises a carrier 17 adapted for carrying a bin 18. The particular example of bin illustrated is of square or other rectangular shape, as viewed in plan and has an external lip 19 at the upper margin of each of its walls. Between the lip and each bin wall, there is defined a downwardly-facing channel for receiving respective upper portions of teeth 20 incorporated in the carrier 17. These teeth are spaced apart in a direction laterally of the vehicle by gaps which receive gussets connecting the lip 19 with the bin wall. Such bins are well known and typically include a pair of wheels, not shown in the drawing.

The carrier 17 further comprises left and right side members 21 and 22 respectively which are of generally plate-like form, are spaced apart laterally of the vehicle and are connected together by a tube 23 on which the teeth 20 are rigidly mounted. The carrier further comprises a rail 24 which is parallel to and is spaced downwardly from the tube 23 and which also extends between and connects together the side members 21 and 22. When the bin 18 is lifted by the carrier 17, a lower part of one wall of the bin rests against the rail 24. The rail controls the attitude of the bin relative to the carrier.

The side member 21 extends somewhat rearwardly from the tube 23 and the row of teeth 20 thereon to define with the row of teeth a corner into which the bin 18 can be pushed. If the bin is pushed into engagement with the side member 21 and with the teeth 20, the bin occupies a pre-determined position relative to the carrier such that the teeth 20 can enter properly the channel defined by the bin.

Retaining means is provided for retaining the bin on the carrier at least during tipping of the bin. The retaining means comprises an elongated retainer 25 which is disposed between the side members 21 and 22 and is connected therewith for pivoting relative to the side members about a retainer axis 26 which is spaced from the teeth 20. The retainer is "L" shaped in transverse cross-section and is arranged so that one limb extends generally upwardly from the retainer axis 26 and the other limb extends rearwardly from the upper margin of the one limb. This other limb extends without interruption from a position near to the side member 21 to a position near to the side member 22. The upwardly extending limb may be interrupted and may have the form of a pair of legs extending downwardly adjacent to opposite ends of the other limb.

Figure 3:
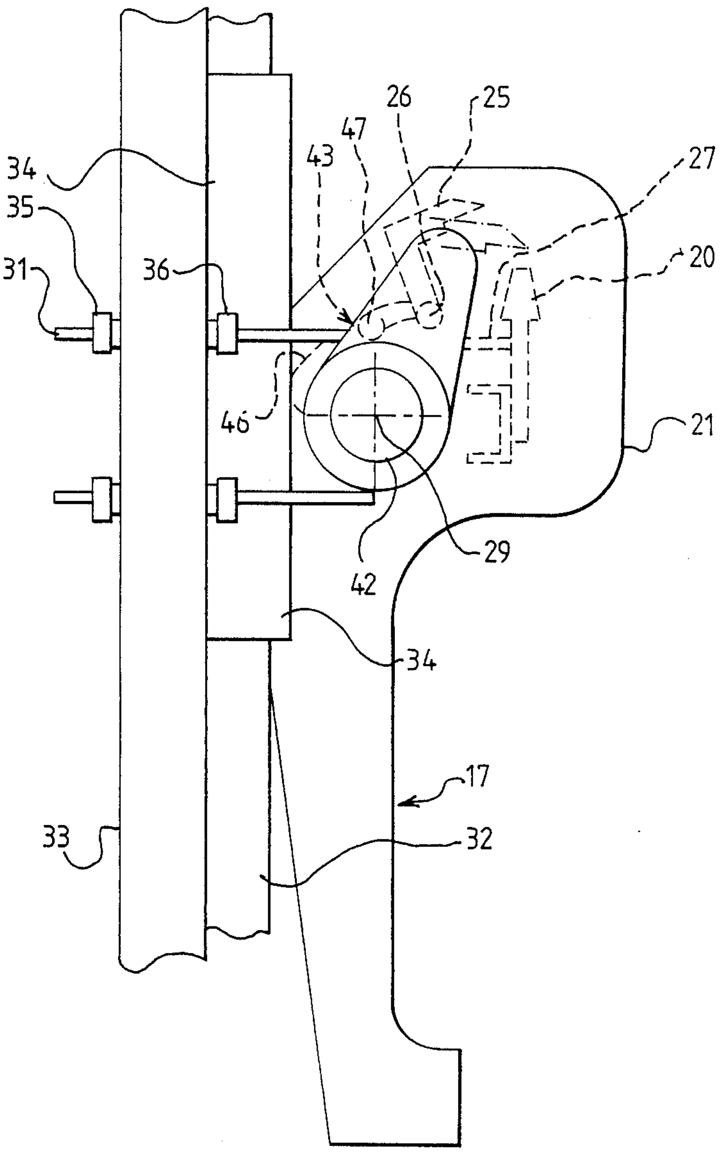
FIG. 3 shows on an enlarged scale certain parts of FIG. 1.
Figure 4:
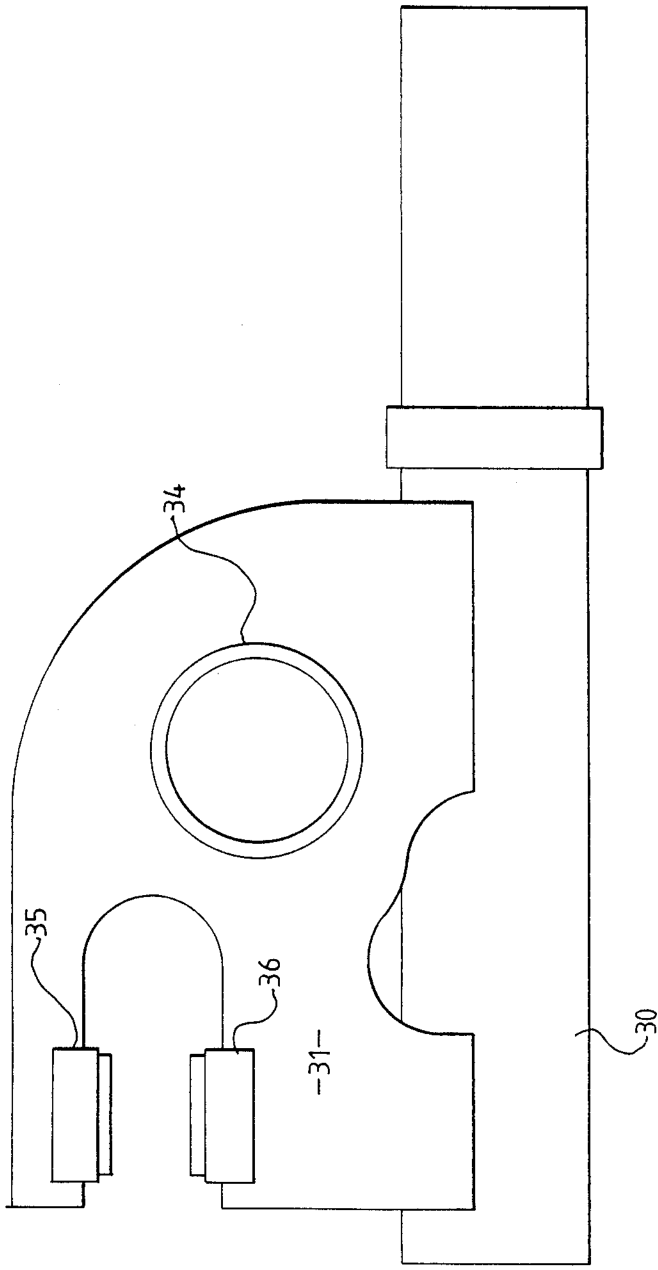
FIG. 4 shows a plan view of parts shown in FIG. 3.

The retainer can pivot between a retaining position (represented by a chain line in FIG. 3), in which the second limb overlies the teeth 20 and a lip of a bin resting on those teeth, and a retracted position in which the second limb is spaced from the bin and from the teeth 20 in a direction forwardly with respect to the vehicle. The means for pivoting the retainer 25 will be described hereinafter.

At the rear of each of the teeth 20, there is provided a respective platform 27 which extends from the tooth in a direction away from the interior of a bin on the carrier. The lip 19 of the bin rests on the platform 27 and may be held in engagement with the platform by engagement of the retainer 25 with a flange of the bin connecting the lip with the side wall of the bin.

The hoist 15 further comprises a carriage 28 on which the carrier 17 is mounted for pivoting relative to the carriage about a pivot axis 29 which is generally horizontal and extends laterally of the vehicle body. The pivot axis 29 coincides with the axis of the tube 23, is spaced somewhat rearwardly from the loading opening defined by the body 14 and is spaced a short distance from the retainer axis 26.

The carriage 28 comprises a tube 30 which is co-axial with the tube 23, is considerably longer than is the tube 23, is of smaller diameter than the tube 23 and which lies partly inside the tube 23. A pair of axially spaced bearings 44, 45 are interposed between the tubes 23 and 30 to support the carrier on the tube 30 for pivoting about the axis 29. The tube 30 is supported as a cantilever by a bracket 31 which is spaced along the tube 30 from the tube 23.

Guide means is provided on the vehicle body 14 for guiding the carriage 28 upwardly and downwardly along a rectilinear path. The guide means is also adapted to maintain the carriage in a predetermined attitude relative to the body. In the particular example illustrated, the guide means comprises a pair of mutually parallel guide bars 32 and 33 disposed in side-by-side relation and spaced slightly apart. The carriage is in sliding contact with both of the guide bars so that movement of the carriage in a horizontal plane relative to the guide bars is restrained. It will be understood that a single guide bar of appropriate shape may be used in place of the pair of guide bars. The guide bars are preferably hollow but it would be within the scope of the invention for one or both of the guide bars to be of solid cross-section. The guide bars are held at their upper and lower end portions in fixed positions with respect to the body 14.

There are formed in the bracket 31 of the carriage 28 respective openings through which the guide bars 32 and 33 extend. In the example illustrated, the guide bar 32 is cylindrical and is completely surrounded by the bracket. In the opening of the bracket through which the guide bar extends, there is fixed a sleeve 34 which is a sliding fit on the guide bar 32. It will be understood that suitable bearings may be provided in upper and lower end portions of the sleeve 34. The length of the sleeve 34 is short, as compared with the length of the guide bar 32, but is substantially greater than the diameter of the tube 23.

The guide bar 33 is of rectangular shape in transverse cross-section and may, for example, be formed of square-section tube. The opening of the bracket 31 through which the guide bar 33 extends is open at one side, that is the side remote from the guide bar 32. A pair of opposite external faces of the guide bar 33 are engaged by respective shoes 35 and 36 provided on the bracket 31. There is no contact between the bracket and the other two external surfaces of the guide bar 33. The shoes 35 and 36 may each have a length which is substantially less than that of the sleeve 34. It will be noted that a medial plane of the guide bar 33, lying mid-way between those external faces of the guide bar which are engaged by the shoes 35 and 36, is spaced from the axis defined by the cylindrical guide bar 32. The arrangement avoids jamming of the carriage on the guide bars, in the event of slight deformation of the guide bars, whilst providing good control of the attitude of the carriage relative to the vehicle body 14.

A motor is provided for raising the carriage 28 along the guide bars 32 and 33 and for pivoting the carrier 17 relative to the carriage. This motor is preferably an hydraulic piston and cylinder unit 37 and may be mounted with its axis extending through the bracket 31, so that the piston of the unit can conveniently be connected with the bracket. Alternatively, the motor may be offset from the path of travel of the carriage 28 and connected with the carriage by a pivoted linkage. With this alternative arrangement, the stroke of the piston and cylinder unit may be less than the stroke of the carriage. Other forms of motor may be used, where a linkage is provided to transmit motion from the motor to the carriage.

Means is provided for pivoting the carrier 17 relative to the carriage 28 during a final portion of upward movement of the carriage relative to the vehicle body 14.

In the example illustrated, this means is incorporated in the guide means and comprises a track 38 (omitted from FIG. 1) which is mounted in a fixed position with respect to the body 14, for example being mounted on the guide bar 33. On the carrier 17, there is provided an element 39 which co-operates with the guide means to control tipping of the carrier relative to the carriage.

The element 39 is a roller supported from the carrier at a position spaced from the tipping axis 29. An inner shaft 42 extends through the interior of the tube 30 and therefore through the interior of the bearings 44 and 45. Opposite end portions of the shaft protrude from the tube 30. At one of these end portions, remote from the guide bars 32, 33, the shaft 42 is secured to the tube 23 of the carrier. On an opposite end portion of the shaft 42, there is secured an arm 41 which carries the roller 39.

The track 38 defines for the roller 39 a path which includes a lower, rectilinear portion and an upper, curved portion. The rectilinear portion of the track is parallel to the guide bars 32 and 33 so that, when the roller moves along the rectilinear portion of its path, its path is parallel to that of the carriage. As the carriage approaches the upper end portion of its path, the roller 39 abuts the curved portion of the track 38 and is diverted from a rectilinear path parallel to that of the carriage. The roller is diverted in a forwards direction relative to the vehicle so that the carrier is caused to tip relative to the carriage about the axis 29. The track 38 restricts upward movement of the roller 39, whilst the carriage continues along its rectilinear path defined by the guide bars 32 and 33. Typically, the carrier 17 and the bin 18 are turned through an angle of 140° relative to the carriage 28 before the carriage reaches the limit of its upward travel. It will be noted that the carriage is constrained to move upwardly along a rectilinear path and is prevented from turning about any axis.

In each hoist illustrated in the accompanying drawings, the track 38 lies further from a longitudinal centreline of the vehicle than do the bracket 31 and the guide bars 32 and 22. This arrangement may be modified by mounting the track 38 nearer to the longitudinal centreline of the vehicle than are the guide bars and securing the arm 41 directly on the tube 23 of the carrier. In this case, the shaft 42 is omitted.

In a further modification of the arrangement illustrated in the accompanying drawings, the means for pivoting the carrier 17 relative to the carriage 28 includes the piston and cylinder unit 37. In the arrangement illustrated, the piston and cylinder unit is connected with the bracket 31 at a position lying substantially in a vertical plane containing the tipping axis 29. In the modified arrangement, the piston and cylinder unit is connected with the carrier at a position spaced from that vertical plane. The piston and cylinder unit is connected with an arm projecting radially from the tube 23 in a rearwards direction. Accordingly, when the piston and cylinder unit is contracted, it exerts on the carrier both an upwardly directed force and a torque which tends to turn the carrier relative to the carriage about the axis 29. Whilst the carriage is in a lower part of its path, tipping of the carrier relative to the carriage is restrained by the action of a roller corresponding to the roller 39 and mounted on the carrier and running in a rectilinear portion of a track corresponding to the track 38. As the carriage approaches an upper end portion of its path of travel, the roller is permitted to diverge from its rectilinear path, thereby permitting the carrier to turn under the torque exerted by the piston and cylinder unit.

In a further alternative arrangement for pivoting the carrier 17 relative to the carriage 28, there is provided on the carrier a roller corresponding to the roller 39 or a row of such rollers and there is fixed with respect to the guide bars an abutment for engaging this roller or these rollers in succession to restrict upward movement of the rollers and thereby cause the carrier to tip relative to the abutment as the carriage continues to move upwardly. Where a row of rollers is provided, these may be acted on in turn by the abutment, as the carrier tips. The abutment may have the general form of a rack with a row of recesses for receiving respective ones of the rollers.

A cam and follower mechanism 43 is provided for pivoting the retainer 25 relative to the carrier 17. The cam 46 of the mechanism 43 is fixed with respect to the carriage 28 and the follower 47 is carried around the pivot axis 29 by the carrier 17 during pivoting of the carrier relative to the carriage. The cam mechanism 43 may be arranged to pivot the retainer 25 in one direction only, a spring being provided to urge the retainer in the opposite direction. Alternatively, the cam mechanism may be arranged for pivoting the retainer in one direction when the carrier is pivoted upwardly relative to the carriage and in the opposite direction when the carrier is pivoted downwardly relative to the carriage. The cam mechanism is so arranged that the retainer 25 is moved into its retaining position during an initial part of the pivotal movement of the carrier relative to the carriage and then remains in its retaining position until pivoting of the carrier in the reverse direction has almost been completed. In a case where the retainer is pivoted in only one direction by the cam and follower mechanism, this is preferably from the retracted position to the retaining position. As the carrier 17 is tipped back into its upright attitude, the retainer may be biased towards its retracted position by gravity and/or the action of a spring.

It will be noted that motion is transmitted from a single motor 37 to move the carriage 28 along the guide bars, to pivot the carrier 17 relative to the carriage and to pivot the retainer relative to the carrier.

After the contents of the bin have been discharged into the body 14, the motor 37 is reversed and the carrier 17 is permitted to pivot downwardly under the action of gravity, and controlled by the motor 37, as the carriage 28 slides down the guide bars 32 and 33 under the action of gravity and also controlled by the motor 37. The steps of raising, tipping, clamping, unclamping, tipping downwardly and lowering a bin are all performed automatically in the proper sequence, merely by operating the single motor 37 and without use of sequencing controls in the hydraulic system.

The bearings 44 and 45 are disposed inside the tube 23 and are therefore protected by the tube. Opposite ends of the tube may be substantially closed to prevent unimpeded ingress of foreign matter which might contaminate the bearings. The bearings can therefore readily be maintained in a clean condition and significant wear of the bearings can be avoided. The hoist 15 does not include other bearings which require maintenance. It is expected that the hoist hereinbefore described will require very little maintenance, compared with the maintenance required to keep known hoists in good working order.

The hoist 16 comprises components corresponding to those hereinbefore described of the hoist 15. The guide means of each of hoist is disposed adjacent to a respective side wall of the vehicle body 14 and so lies at the side of the associated carrier which is remote from the other hoist. Accordingly, when the carriers are both lowered, the loading opening defined by the body 14 is substantially unobstructed. When both of the carriers are raised, a lower part of the loading opening is unobstructed. Usually, the hoists will be operated independently to tip the contents of respective bins into the body 14. The hydraulic motors of the two hoists can be operated in unison so that a single, large bin can be raised by the carriers of the two hoists, acting together.

It will be understood that the form of the carriers can be adapted to different bins and that the invention may be applied to a vehicle intended for raising and tipping bins designed to be lifted other than by means of an external lip.

Different vehicles require bins to be lifted to different heights for tipping. In cases where lifting and tipping is achieved by relatively complex linkages, it is generally necessary to re-design the linkage in order to achieve a greater or smaller lift-height. With the arrangements hereinbefore described, the stroke of the piston and cylinder unit and the length of the guide bars can be adjusted according to the required lift height and other components of the hoist can be used, without modification, in vehicles requiring different lift heights. Indeed, guide bars having the same length may be used in a range of vehicles in which the carriages travel through different distances along the guide bars.

The guide bars 32 and 33, the motor 37 and other parts of the hoist may be mounted directly on the body 14 of the vehicle, for example by means of suitable brackets. Alternatively, the hoist may incorporate a frame on which the guide bars, the motor and other parts of the hoist 15 and corresponding parts of the hoist 16 are mounted, the frame being secured on the vehicle body 14.

What is claimed is:

1. A hoist suitable for mounting on a collection vehicle for raising a bin from the ground and tipping contents of the bin into a body of the vehicle, wherein the hoist includes:

a carriage;

a guide means for guiding the carriage for reciprocation along a rectilinear path relative to the vehicle body;

a motor for moving the carriage along said path;

a carrier for a bin, the carrier being mounted for tipping relative to the carriage about a tipping axis;

a cam;

a follower, one mounted for movement with the carriage along said path and the other mounted in a fixed position relative to the body of the vehicle for tipping the carrier relative to the carriage when the carriage is reciprocated relative to the body of the vehicle;

retaining means for retaining a bin on the carrier; and operating means for applying the retaining means to and withdrawing the retaining means from the bin, when on the carrier, wherein the operating means includes a second cam and follower having elements, one element mounted on the carrier and one element mounted on the carriage and wherein said elements cooperate when the carrier is pivoted relative to the carriage.

2. A hoist suitable for mounting on a collection vehicle for raising a bin from the ground and tipping contents of the bin into a body of the vehicle, wherein the hoist includes:

a carriage;

a guide means for guiding the carriage for reciprocation along a rectilinear path relative to the vehicle body;

a motor for moving the carriage along said path;

a carrier for a bin, the carrier being mounted for tipping relative to the carriage about a tipping axis;

a cam; and a follower, one mounted for movement with the carriage along said path and the other mounted in a fixed position relative to the body of the vehicle for tipping the carrier relative to the carriage when the carriage is reciprocated relative to the body of the vehicle, wherein the guide means comprises two mutually parallel bars in side-by-side relation, one of said bar is embraced by the carriage, the carriage has spaced shoes defining between them a gap in which the other of the bars is received, wherein respective faces of said other bar which are engaged by the shoes are flat, mutually parallel faces and wherein a plane lying midway between said faces is spaced from an axis of the one bar.

3. A hoist suitable for mounting on a collection vehicle for raising a bin from the ground and tipping contents of the bin into a body of the vehicle, wherein the hoist includes:

a carriage having a tubular portion;

a guide means for guiding the carriage for reciprocation along a rectilinear path relative to the vehicle body;

a motor for moving the carriage along said path;

a carrier for a bin;

bearings having an axis of rotation for supporting the carrier from said tubular portion of said carriage for tipping relative to the carriage about a tipping axis, wherein the carrier comprises a hollow structure containing and protecting said bearings supported by said tubular portion of said carriage inside said hollow structure, wherein said axis of rotation of said bearings defines said tipping axis;

an inner shaft which has a first and a second end and which extends through said tubular portion of said carriage; and a cam means including a follower element and a cam, wherein the carrier is provided with said follower element which is mounted on said shaft adjacent to said first end of said inner shaft and is spaced from the tipping axis, wherein said cam guides said follower element, and wherein said second end of said inner shaft extends adjacent to and is connected with said hollow structure of said carrier.

4. A hoist according to claim 3 wherein the carrier further comprises a row of teeth secured on the hollow structure, the teeth being spaced apart along the tipping axis.

5. A hoist according to claim 4 further comprising a respective platform which extends from each tooth in a direction away from the interior of a bin, when supported on the carrier.

6. A hoist according to claim 4 wherein the carrier has a retaining bar mounted for pivoting relative to the carrier towards and away from the teeth for retaining a lip of a bin on the teeth and wherein there is provided a second cam and follower mechanism for pivoting the retaining bar relative to the carrier when the carrier is pivoted relative to the carriage.

7. A collection vehicle having a body for receiving a load of material to be collected and a pair of hoists, wherein each of said hoists is as set forth in claim 3, and further wherein each of said hoists is suitable for mounting on a collection vehicle for raising a bin from the ground and tipping contents of the bin into the body of the vehicle, wherein each hoist includes a carriage having a tubular portion, a guide means for guiding the carriage for reciprocation along a rectilinear path relative to the vehicle body, a motor for moving the carriage along said path, a carrier for a bin, and bearings having an axis of rotation for supporting the carrier from said tubular portion of said carriage for tipping relative to the carriage about a tipping axis, wherein the carrier comprises a hollow structure containing and protecting said bearings supported by said tubular portion of said carriage inside said hollow structure, wherein said axis of rotation of said bearings defines said tipping axis, and wherein said second end of the inner shaft of each of said hoists is adjacent to the other hoist.

* * * * *